Dec. 9, 1930.  L. L. LOMAR  1,784,529
SHOCK ABSORBER
Filed Aug. 26, 1926
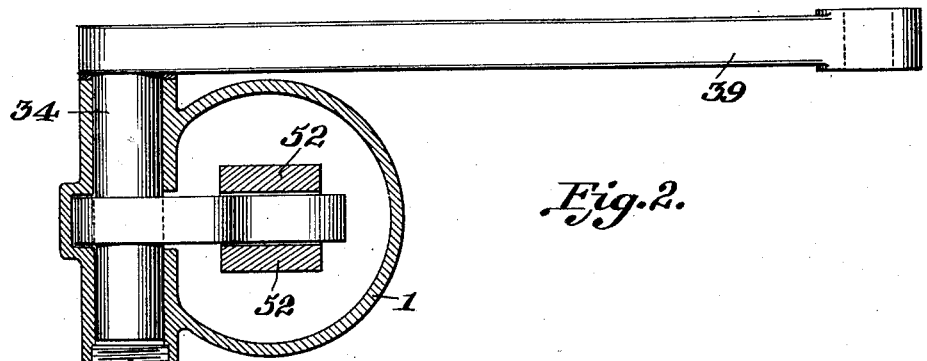
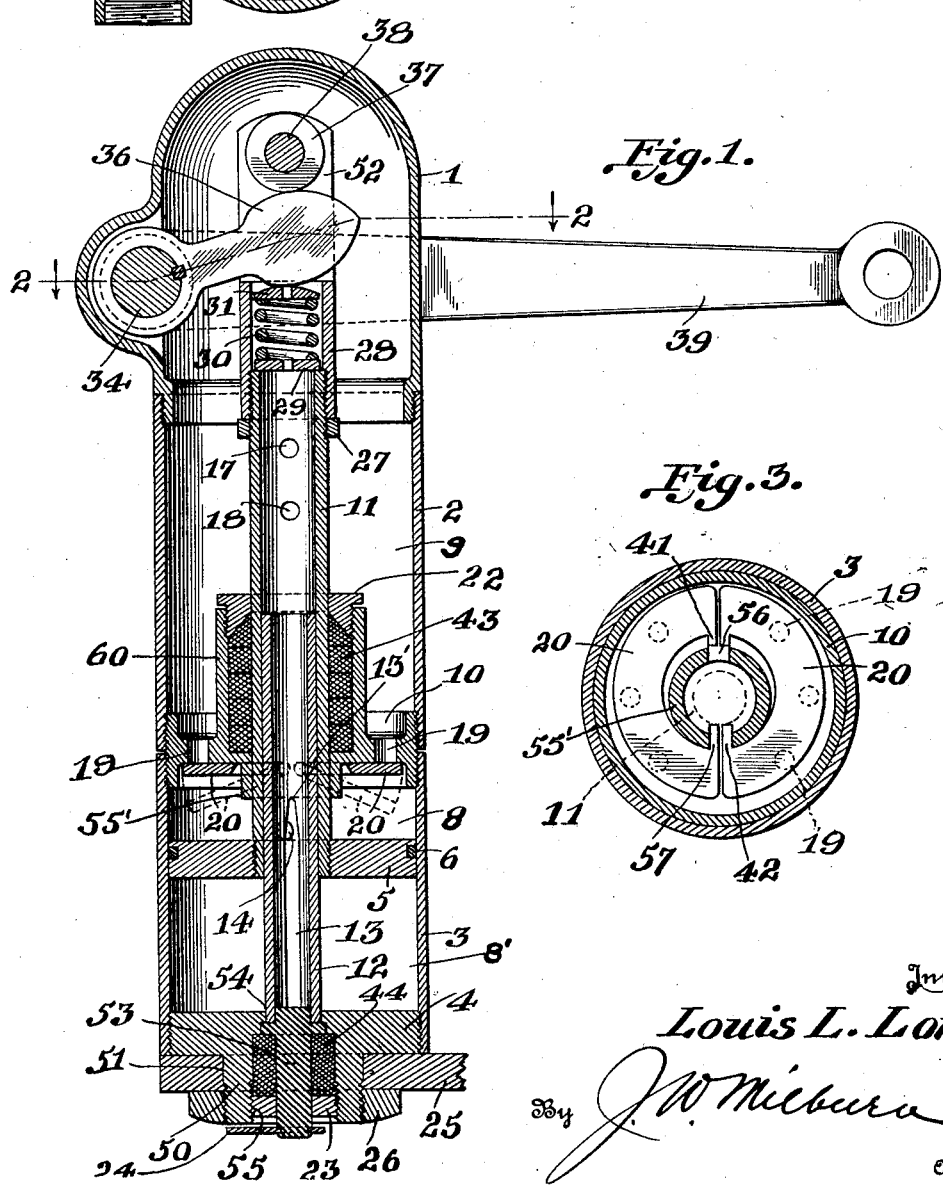
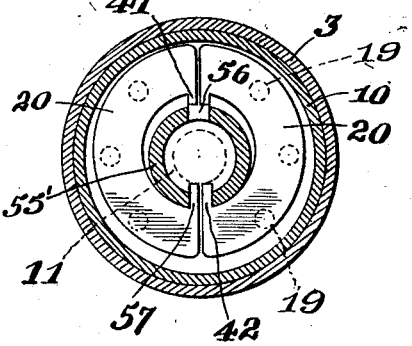
Inventor
Louis L. Lomar Patented Dec. 9, 1930

1,784,529

UNITED STATES PATENT OFFICE

LOUIS L. LOMAR, OF HOUSTON, TEXAS, ASSIGNOR OF FORTY-NINE ONE-HUNDREDTHS TO THE HOUSTON COMPANY, OF HOUSTON, TEXAS, A CORPORATION OF TEXAS

SHOCK ABSORBER

Application filed August 26, 1926. Serial No. 131,684.

My invention relates to shock absorbers adapted to be used on automobiles and similar structures, and particularly to shock absorbers of the type in which a piston moves within a fluid containing cylinder.

Shock absorbers of this type are usually constructed so as to permit a portion of the fluid in the path of the compressing or moving member to escape to a space out of the path of the moving member. Valved passageways to permit the escape of the fluid at a rate sufficiently slow to retard the movement of the moving member are ordinarily provided. The ports of the above-mentioned valves of the shock absorbers now in use usually have a fixed or constant area and it therefore follows that the fluid escapes from the path of the moving or compressing member at a fixed and constant rate of flow, regardless of the position of the compressing member.

Another disadvantage of most fluid-type shock absorbers resides in the fact that the fluid is compressed by slight movements of the vehicle, such as may develop upon ordinarily smooth roads. The ordinary vehicle springs are constructed to efficiently counteract these slight shocks and if the shock absorber interferes with the spring motion in such cases, the easy riding quality of the automobile is seriously affected.

The principal object of my invention is to provide a shock absorber of this general type in which the rate of flow of the fluid from the path of the compressing member will be varied according to the position of the compressing member.

Another object of my invention is to provide a shock absorber of the piston type which will be so constructed as to permit free movement of the vehicle spring during travel over ordinarily smooth roadways.

A further object of my invention is a shock absorber of the fluid type which is simple in construction and manufacture but which will entirely enclose all moving parts and will thoroughly lubricate all parts.

A still further object is the provision of means to readily adjust the valves of the shock absorber so that the rate of flow of the fluid may be readily adjusted for various types of automobiles and differing road conditions.

A still further object of the invention is the provision of a reservoir for the fluid provided with means to regulate the flow of liquid between the reservoir and the fluid cylinder in accordance with the position of the compressing member or piston in the fluid cylinder.

Fig. 1 of the drawings is a vertical sectional view of the shock absorber.

Fig. 2 is a horizontal sectional view, taken on the line 2—2 of Fig. 1.

Fig. 3 is a horizontal sectional view showing the manner in which the pivoted valves of the device may be placed in position.

In the drawings, the numeral 1 designates an upper casing section of the shock absorber. An intermediate section 2 is joined to section 1 by a screw-threaded joint and is also joined to a lower section 3 by a partition plate 10 screw-threaded to engage sections 2 and 3. The lower end of the section 3 is closed by a plug 4 also screw-threaded thereto. Plate 10 divides the interior of the casing into a piston chamber 8 and a reservoir chamber 9 in communication through valved passages 19.

The plug 4 is provided with a central depending boss 50 which is adapted to be inserted in an aperture 51 of an attaching plate or bracket 25 fixed to the automobile axle. A nut 26 will be placed upon the boss 50 to hold the shock absorber upon the axle bracket. An actuating lever 39 has its free end connected to the automobile body and includes a shaft 34 journaled in a lateral extension of casing section 1. A cam lever 36 is keyed to the shaft 34 and its inner end extends to the central portion of the casing 1 and engages the upper portion of the piston rod 11 of the shock absorber to move the latter upon movement of the actuating lever 39.

The upper portion of the piston rod 11 comprises a tubular member 28 having its upper end bifurcated to form spaced upright arms 52 which support, between them, a roller 37 on a pin 38. The upper face of cam lever 36 contacts with the roller 37, between the arms 52, as shown, and the lower face of the cam engages a disk 31 fitted within the tubular member 28 and seated upon a spring 30 which, in turn, bears upon a second disk 29. The cam 36 is preferably convex on its lower face, as shown in the drawings. This construction causes the point of engagement between the cam 36 and disk 31 to move outwardly along the cam lever as the disk is depressed and an increasing leverage is thereby exerted by the cam lever. The tube 28 is screw-threaded at its lower end to the main portion of the hollow piston rod 11 which extends into the tube 28 and thus supports the disk 29. A lock nut 27 is provided to more securely hold together the parts 11 and 28. Vertically spaced apertures or ports 17 and 18 are provided in the piston rod 11 below the tube 28, for a purpose hereinafter set forth. The piston rod 11 is guided by a packing 43 and packing nut 22 carried in a sleeve 60 arranged on the upper side of partition plate 10 and a piston 5 is fixed to the rod below this plate. Piston 5 is provided with packing rings 6 to insure proper compression. The lower end of the piston rod 11 is slidable upon a tubular valve member 12 which extends up into the rod 11, preferably to a point adjacent the upper edge of packing nut 22.

The lower end or stem 53 of the tubular valve member 12 is closed and is fitted in an aperture 54 which passes through the plug 4 and the boss 50 thereupon. The aperture 54 is threaded at 55 and a nut 23 engages these threads to tighten a packing 44 within the aperture. The stem 53 passes through the nut 23, there being no threaded connection between the two parts, and terminates below the boss 50. The walls of the tubular valve member 12 are slotted at 13, the slots extending longitudinally of the valve 12 and being circumferentially spaced. The slots 13 preferably extend along the valve 12 from the plug 4 to the lower side of the partition plate 10, and are tapered so as to be somewhat smaller at the latter point, as shown at 13'. A pointer 24 is secured to the extreme lower end of the stem 53 of the valve 12 and serves to indicate the position of the slots 13 of the valve 12 with respect to ports 14 in the lower end of the piston rod 11. It will be seen that rotation of the stem 53 will change the relative position of the ports 13 and 14 to regulate the flow of fluid through these ports.

A pair of preferably arcuate pivoted valve plates 20 are fastened to a sleeve 55' upon the lower side of the partition plate 10 and, when seated, close ports 19 circumferentially spaced about the partition plate 10. As shown in Fig. 3, the curvature of the valve plates 20 is somewhat greater than that of the sleeve 55' and the plates are provided with inwardly extending pins or lugs 41 and 42 at their ends to engage openings 56 and 57, respectively, in the sides of the sleeve 55'. The pins 41 are slightly longer than the pins 42 and, because of this arrangement, the valve plates may be fitted to the partition plate 10 before the latter is placed upon the piston rod 11, the pins 41 being fitted in openings 56 in sleeve 55' and the plates then being moved transversely of the sleeve 55' to cause the shorter pins 42 to engage the diametrically opposite openings 57. The partition plate 10 is then placed upon the piston rod 11 and as the walls of the latter are imperforate opposite the pins 41 and 42, the plates 20 cannot move transversely with respect to partition plate 10 and are thus held in position.

As shown in Fig. 1, the shock absorber casing comprises two compartments; a chamber in which the piston moves and which is divided by the piston into an upper portion 8 and a lower portion 8'; and a second chamber or reservoir 9 above the partition plate 10 and therefore out of the path of movement of the piston.

In use, the shock absorber casing would be filled with oil or other suitable fluid. The lower end of the casing would preferably be attached to a vehicle axle bracket 25 and the outer end of operating lever 39 would be fastened to the vehicle body. When connected to the vehicle in this manner, the parts of the device would normally be in the position shown in full lines in Fig. 1 of the drawings. When the vehicle moves over smooth roadways any movement of the cam 36 will be taken up by the disc 31 and spring 30, without affecting the position of the piston rod 11. If the shock is slightly more severe, the continued downward movement of cam lever 36 will move the piston rod 11 and piston 5 a short distance. However, as shown by broken lines in Fig. 1, the valves 20 are normally open due to gravity and a slight downward movement of piston 5 would merely force oil from chamber 8' through port 13 into tube 12 and thence up and out of ports 17 and 18. This slight movement would not move the piston rod 11 sufficiently to place the port 17 of the piston rod beneath the upper edge of the nut 22 and sleeve 60 and so the flow of oil would be unrestricted and the vehicle springs would not be hampered in their action. Also, on the slight resultant rebound or movement of the vehicle springs to normal position, the piston 5 would move so slightly that it would not close the valves 20 and no retardation of the vehicle springs would result.

However, when the vehicle is moving over stretches of roadway which are so rough as to violently move the car upon its springs, my shock absorber will retard any violent motion in the following manner:—Movement of the vehicle body toward the axle will cause operating lever 39 to move the cam lever 36 and disk 31 downwardly. Continued movement of the disk 31 will compress the spring 30 sufficiently to cause the piston rod 11 and piston 5 to descend. Piston 5 will force the fluid from the chamber 8' out through the port 13 in valve rod 12. This displaced fluid will flow up through rod 12 and into piston rod 11 and, finally, through ports 17 and 18 to chamber 9. However, as the piston rod 11 and piston 5 approach the lower end of the chamber 8', the port 18 in the piston rod will pass beneath the collar 60 and will thus be closed. Continued downward movement will close port 17 in the same manner and, at the same time, the movement of the piston is being progressively retarded because the port 13 in valve rod 12 is being closed by movement of piston 5. A small portion of fluid will flow into chamber 8 through port 14 in piston rod 11. Some of the fluid will also pass entirely up through the piston rod 11 and will forcibly lubricate the spring 30, cam 36 and roller 37. Ports are provided in disks 29 and 31 to permit this flow. The check valves 20 will of course be open during downward movement of the piston and fluid will be drawn from chamber 9 into chamber 8.

The "rebound" or movement of the vehicle body away from the axle, will cause the cam lever 36 to move the piston rod 11 and piston 5 upwardly. This movement will be retarded by the fluid in the chamber 8 in the following manner:—The upward movement of the piston will force the fluid against the check valves 20 and they will be closed, so that the only path of escape for the fluid in chamber 8 will be through port 14 in piston rod 11, this port being aligned with the port or slot 13 in valve rod 12. Fluid passing through this aperture will travel through the rod 12 either to chamber 8' or chamber 9 but its flow will be progressively retarded due to the fact that the slot 13 tapers inwardly at its upper end 13', thus considerably restricting any excessive upward movement of the piston 5.

It will be understood that the shock absorber may be positioned as mentioned above or the upper part 1 of the casing may be fixed to the vehicle body by any suitable form of bracket and operating lever 39 may be reversed and connected to the axle by a link. The operation of the device in the latter position will be the same as that set out above.

I claim:—

1. In a device of the character described, a casing adapted to contain a fluid, a partition dividing said casing into two chambers, an operating lever, said casing and lever being adapted to be attached to relatively movable parts of a vehicle, a piston within one of the chambers of said casing, a hollow piston rod operatively connecting said piston to said lever, said piston rod having ports opening into both of the chambers of said casing and means to progressively retard the flow of fluid through said ports upon movement of said piston and piston rod.

2. In a device of the character described, a casing adapted to contain a fluid, said casing being divided to form two chambers, an operating lever, said lever and casing being adapted to be attached to relatively movable parts of a vehicle, a piston in one of the chambers of said casing, a hollow piston rod operatively connecting said piston and lever and passing through both of said chambers, said piston rod having ports opening into both of said chambers, a tubular valve within said piston rod, said valve having ports therein, a port of the piston rod and valve being positioned to vary the flow of liquid upon movement of the piston and piston rod.

3. In a device of the character described, a casing adapted to contain a fluid, said casing being transversely divided to form a piston chamber and a reservoir chamber, respectively, an operating lever, said casing and said lever being adapted to be attached to relatively movable parts of a vehicle, a piston within the piston chamber, a hollow piston rod operatively connecting said piston to said operating lever, said piston rod extending through both the reservoir chamber and the piston chamber and having ports opening into each chamber, a tubular valve member in the piston chamber and fitted within the piston rod, said valve member having a longitudinal slot therein extending substantially the length of the piston chamber to normally place the piston chamber in communication with the reservoir chamber, said valve member being rotatable to vary the position of its slot relative to the piston rod piston chamber port, said tubular valve member extending into the piston rod to close the piston rod reservoir chamber port upon continued movement of the piston rod in one direction and a check valve between the two chambers.

4. In a device of the character described, a casing adapted to contain a fluid, a partition in said casing dividing the interior thereof into two chambers, a piston in one of said chambers, a hollow piston rod passing through said partition, said piston rod having ports opening into said chambers, and a hollow valve stem within said piston rod, said valve having a port therein, the ports of the piston rod and valve stem being positioned to vary the flow of fluid between said chambers upon movement of the piston and piston rod, said casing and piston rod being adapted to be attached to relatively movable parts of a vehicle.

5. In a device of the character described, a casing adapted to contain a fluid, a partition within said casing dividing its interior into chambers, a piston in one of said chambers, a hollow piston rod open to the piston chamber and having an aperture in its wall on the opposite side of said partition, and a tubular valve mounted in said casing and extending into said hollow piston rod, said valve having an aperture which is gradually closed by the movement of the piston.

6. In a device of the character described, a casing adapted to contain a fluid, a partition within said casing, dividing its interior into chambers, a piston in one of said chambers, a hollow piston rod open at one end to the piston chamber and having an aperture in its wall providing communication with the other chamber, and a tubular valve in said casing extending into said hollow piston rod, said valve having a tapered slot which is gradually closed by the movement of the piston.

7. In a device of the character described, a casing adapted to contain a fluid, a partition dividing the casing into chambers, a piston in one of said chambers, a hollow piston rod passing through said partition and open to the piston chamber, said piston rod having a plurality of apertures providing communication with the other of said chambers, which apertures are gradually closed by the movement of the piston rod in one direction, and a tubular valve extending into said hollow piston rod and having an aperture which is gradually closed by the movement of the piston.

8. In a device of the character described, a casing adapted to contain a fluid, a piston in said casing, a hollow piston rod passing through said piston and open at its piston end, said piston rod having a plurality of apertures providing a passage for fluid between opposite sides of said piston, means in said casing adapted to close said apertures seriatim by movement of the piston, and a tubular valve extending into said hollow piston rod and having an aperture which is gradually closed by the movement of the piston.

9. In a device of the character described, a casing adapted to contain a fluid, a partition dividing the interior of the casing into chambers, a piston in one of said chambers, a hollow piston rod passing through said partition and open to the piston chamber, said piston rod having an aperture providing communication with the other chamber, and a tubular valve extending into said hollow piston rod and having an aperture in its wall, the apertures in the tubular valve and hollow piston rod being controlled by movement of the piston to progressively retard the passage of fluid between the chambers.

10. In a device of the character described, a casing adapted to contain a fluid, a partition dividing the casing into chambers, a piston in one of said chambers, a hollow piston rod passing through said partition and open to the piston chamber, said piston rod having an aperture providing communication with the other of said chambers, a tubular valve extending into said hollow piston rod and having an aperture which is gradually closed by the movement of the piston, and means on said partition adapted to close said piston rod aperture during the movement of the piston rod.

11. In a device of the character described, a casing adapted to contain a fluid, said casing being transversely divided to form a piston chamber and a reservoir chamber, a piston within the piston chamber, a hollow piston rod extending into said reservoir chamber and having a port opening into each of said chambers, a tubular valve extending into said hollow piston rod and having a port therein, the ports of the piston rod and valve being controlled by the movement of the piston and piston rod to progressively retard the passage of fluid therethrough.

12. In a device of the character described, a casing adapted to contain a fluid, a ported partition dividing said casing into a piston chamber and a reservoir chamber, a piston in said piston chamber, a hollow piston rod extending through said partition and having a port open to the reservoir chamber, said port being so positioned as to be controlled by the movement of the piston rod, and a valve stem within said casing extending into said hollow piston rod for controlling the passage of fluid therethrough during the movement of said piston rod.

13. In a device of the character described, a casing adapted to contain a fluid, a partition dividing said casing into a reservoir chamber and a piston chamber and provided with an opening therethrough, a check valve for said opening, a piston in said piston chamber, a hollow piston rod extending through said partition and having a plurality of apertures providing communication with said reservoir chamber, which apertures are gradually closed by the movement of the piston rod, and a tubular valve extending into said hollow piston rod and having an aperture which is gradually closed by the movement of the piston.

14. In a device of the character described, a casing adapted to contain a fluid, a partition dividing said casing into two members, a piston within one of said chambers, a hollow piston rod extending through said partition and having ports opening into each of said chambers, and means in each of said chambers in engagement with said piston rod for gradually closing the piston rod ports to both chambers during the movement of the piston.

15. In a device of the character described, a casing adapted to contain a fluid, a partition dividing said casing into a piston chamber and a reservoir chamber, and having an opening therethrough, a piston in said piston chamber, a hollow piston rod passing through said partition and having ports opening into both of said chambers, means to progressively retard the flow of fluid through one of said ports by movement of the piston, and means to progressively retard the flow of fluid through another of said ports by continued movement of the piston in the same direction.

16. In a device of the character described, a casing adapted to contain a fluid, a piston within said casing, a piston rod open at one end and having a plurality of longitudinally spaced apertures toward the opposite end thereof adapted to be closed seriatim by movement of the piston, and a valve in the open end of the piston rod to gradually close the passage therethrough upon movement of the piston and piston rod.

17. In a device of the character described, a casing adapted to contain a fluid, a partition dividing said casing into a piston chamber and a reservoir chamber, and provided with an opening therethrough, a piston in said piston chamber, a normally open valve for said opening hinged to the underside of said partition and adapted to be closed only by substantial upward movement of the piston, a hollow piston rod extending through said partition and having ports opening into each of said chambers, and means for gradually closing said ports during the movement of the piston.

18. In a device of the character described, a casing adapted to contain a fluid, a partition dividing said casing into a piston chamber and a reservoir chamber and provided with an opening therethrough, a piston in said piston chamber, a normally open valve for said opening hinged to the underside of said partition and adapted to be closed only by substantial upward movement of the piston, a hollow piston rod extending through said partition and having ports opening into each of said chambers, and a valve extending within the hollow piston rod for gradually closing the passage therethrough during downward movement of the piston.

19. In a device of the character described, a casing adapted to contain a fluid, a piston within said casing, a hollow piston rod open to the interior of the casing on one side of said piston and having longitudinally spaced apertures in its wall on the opposite side of said piston, a tubular valve extending into said hollow piston rod and having an aperture in its wall adapted to register with one of said piston rod apertures, said tubular valve being adapted to gradually close another of said piston rod apertures upon movement of the piston.

20. In a device of the character described, a casing adapted to contain a fluid, a piston within said casing, a hollow piston rod open to the interior of the casing on one side of said piston, a tubular valve extending into said hollow piston rod and having an aperture in its wall, said piston rod having an aperture on the opposite side of said piston adapted to register with said valve aperture and which is gradually closed by movement of the piston, and said piston rod having another aperture which is gradually closed by continued movement of the piston in the same direction.

21. In a device of the character described, a casing adapted to contain a fluid, a partition dividing said casing into a piston chamber and a reservoir chamber, said partition having an opening therethrough, a piston in said piston chamber, a normally open valve for said opening adapted to be closed by substantial movement of said piston in one direction, a hollow piston rod extending through said partition and having ports opening into each of said chambers, and means for gradually closing said ports during the movement of the piston.

22. In a device of the character described, a casing adapted to contain a fluid, a partition dividing said casing into two chambers, and provided with an opening therethrough, a piston in one of said chambers, a normally open valve for said opening adapted to be closed by substantial movement of said piston in one direction, a hollow piston rod extending through said partition and having ports opening into each of said chambers, and means in each of said chambers in engagement with said piston rod for gradually closing the piston rod ports to both chambers during the movement of said piston.

23. In a device of the character described, a casing adapted to contain a fluid, a partition dividing said casing into a piston chamber and a reservoir chamber, and having an opening therethrough, a piston in said piston chamber, a normally open valve for said opening adapted to be closed by substantial movement of said piston, a hollow piston rod passing through said partition and having ports opening into both of said chambers, means to progressively retard the flow of fluid through one of said ports by movement of the piston, and means to progressively retard the flow of fluid through another of said ports by continued movement of the piston in the same direction.

24. In a device of the character described, a casing adapted to contain a fluid, a partition in said casing dividing the interior thereof into two chambers, said partition having an opening therethrough and a normally open valve therefor, a piston in one of said chambers, a hollow piston rod passing through said partition and having ports opening into said chambers, and a hollow valve stem within said piston rod, said valve stem having a port therein, the ports of the piston rod and valve stem being positioned to vary the flow of fluid between said chambers upon movement of said piston and piston rod.

25. In a device of the character described, a casing adapted to contain a fluid, a partition in said casing dividing the interior thereof into two chambers, said partition having an aperture and a normally open valve therefor, a piston in one of said chambers, a hollow piston rod passing through said partition, said piston rod having ports opening into said chambers, and valve means for gradually closing communication between said chambers through said hollow piston rod upon movement of said piston in one direction, said partition valve being adapted to close upon substantial movement of the piston in the opposite direction.

26. In a device of the character described, a casing adapted to contain a fluid, a partition in said casing dividing the interior thereof into two chambers, said partition having an aperture therein and a normally open valve therefor, a piston in one of said chambers, a hollow piston rod passing through said partition and having ports to both of said chambers and to both sides of said piston, and a valve in said hollow piston rod for gradually closing communication between one side of said piston to the other during movement of the piston in one direction, the passage through said hollow piston rod from one chamber to the other being closed by continued movement of the piston in the same direction, and the valve for the partition aperture being closed by substantial movement of the piston in the opposite direction.

LOUIS L. LOMAR.